United States Patent Office 2,695,287
Patented Nov. 23, 1954

2,695,287

ISOALLOSPIROSTANE DERIVATIVES AND PROCESS

Norman L. Wendler, Linden, and Harry L. Slates, Roselle, N. J., assignors to Merck & Co., Inc., Rahway, N. J., a corporation of New Jersey No Drawing. Application January 8, 1952, Serial No. 265,531

7 Claims. (Cl. 260—239.55)

This invention is concerned generally with steroid compounds and with processes for preparing them. More particularly, it relates to a novel process for the preparation of hecogenin from naturally-occurring 12-oxygenated 2,3-dihydroxy-allo-sapogenins, such as manogenin and agavogenin, and to the intermediate steroid compounds obtained thereby.

Hecogenin is an important sapogenin which is a potential starting material in the synthesis of 11-oxygenated adrenal cortical hormones, such as corticosterone, cortisone and Compound F. Hecogenin, which has the systematic chemical name 3β-hydroxy-12-keto-22-isoallospirostane, may be represented by the following structural formula:

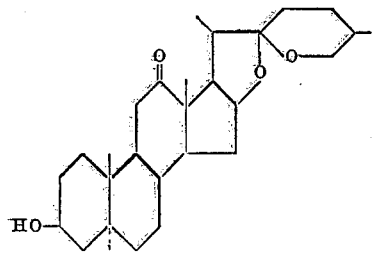

We have discovered that 3β-hydroxy-12-keto-22-isoallospirostane can be prepared by reacting 2,3-dihydroxy-12-keto-22-isoallospirostane, commonly known as manogenin (compound 1, hereinbelow, the radical R being keto), or 2,3,12-trihydroxy-22-isoallospirostane, commonly known as agavogenin (compound 1, the radical R being hydroxy) with a hydrocarbon sulfonyl chloride to produce the corresponding 2,3-bis(hydrocarbon-sulfonoxy)-12-oxygenated-22-isoallospirostane compound (compound 2), reacting the latter compound with an alkali metal iodide to produce the corresponding $\Delta^2$-12-oxygenated-22-isoallospirostene compound (compound 3), reacting said $\Delta^2$-12-oxygenated-22-isoallospirostene compound with perbenzoic acid, or other organic per-acid, thereby forming the corresponding 2,3-epoxy-12-oxygenated-22-isoallospirostane compound (compound 4), reacting this epoxide with a reducing agent to produce 3α,12-dihydroxy-22-isoallospirostane (compound 5), reacting said 3α,12-dihydroxy-22-isoallospirostane with chromic acid to form 3,12-diketo-22-isoallospirostane, commonly known as hecogenone (compound 6), reacting the latter compound with a reducing agent to form 3β,12-dihydroxy-22-isoallospirostane, commonly known as rockogenin (compound 7), reacting said 3β,12-dihydroxy-22-isoallospirostane with approximately one equivalent of an acylating agent thereby selectively acylating the 3β-hydroxy group and forming 3β-acyloxy-12-hydroxy-22-isoallospirostane (compound 8), reacting this compound with chromic acid to form 3β-acyloxy-12-keto-22-isoallospirostane (compound 9), and reacting the latter compound with a hydrolyzing agent to produce 3β-hydroxy-12-keto-22-isoallospirostane, commonly known as hecogenin (compound 10).

The reactions indicated hereinabove may be chemically represented as follows:

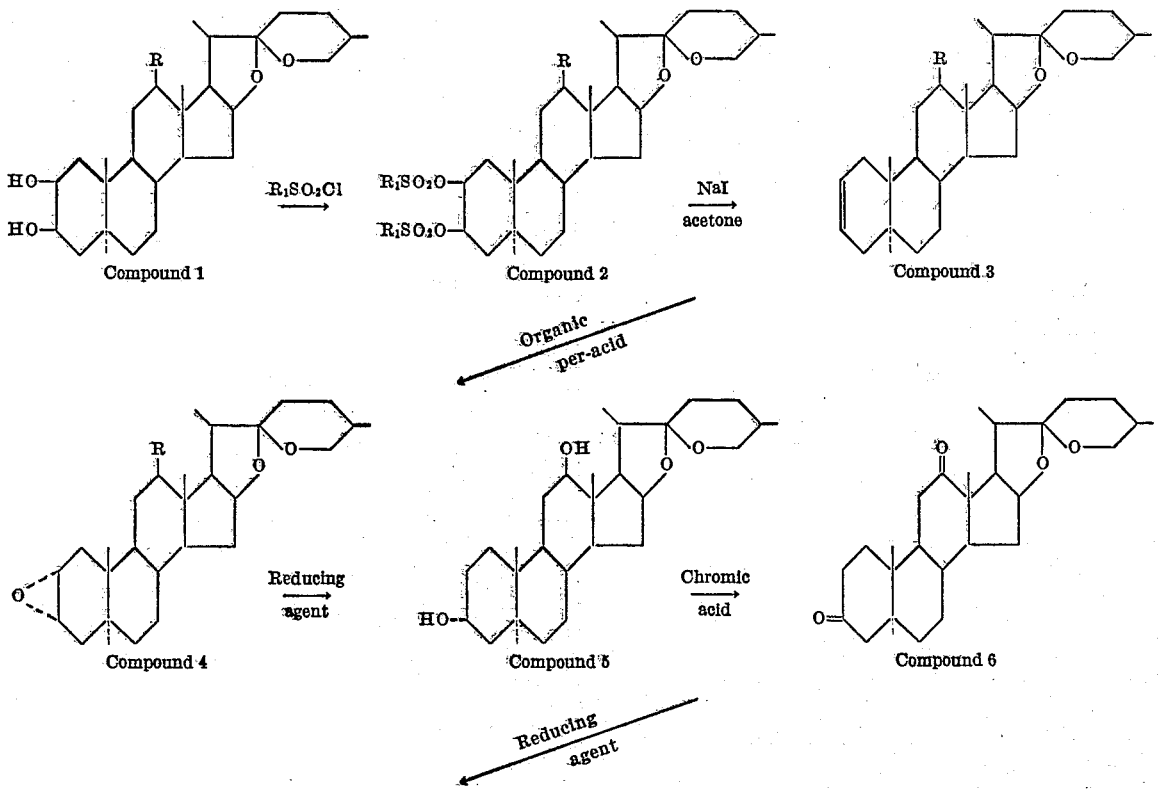

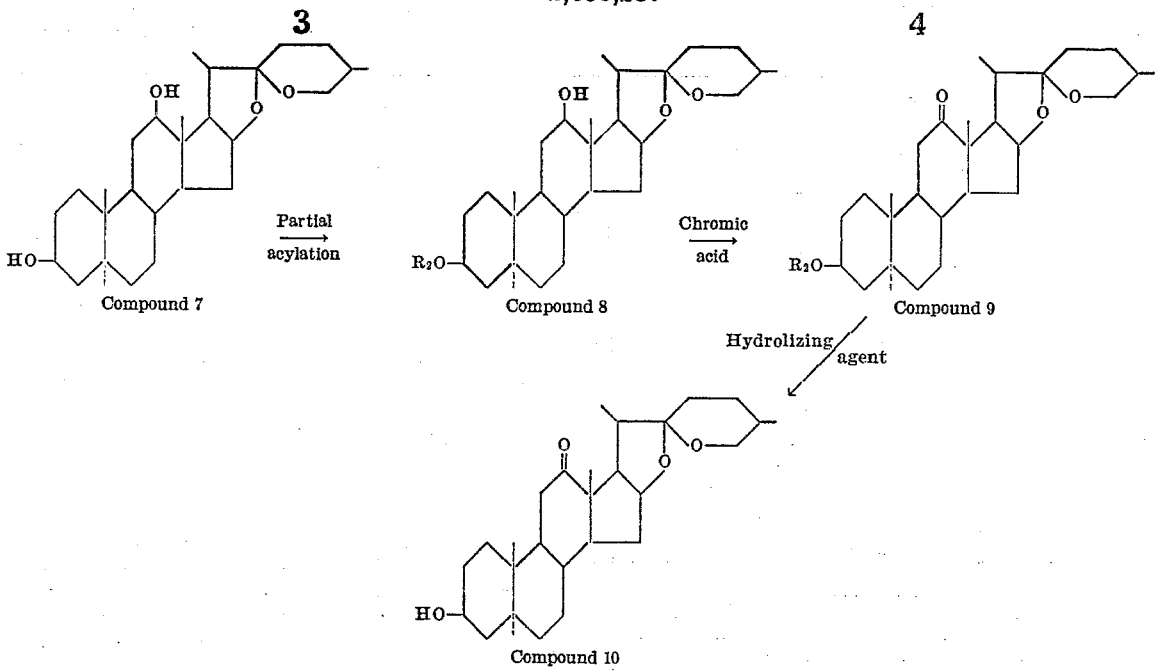

In the foregoing formulae, R is a keto or hydroxy radical, $R_2$ is acyl, and $R_1$ is an alkyl, aryl or aralkyl radical.

As starting materials in carrying out our novel process we can employ the free, naturally-occurring 2,3-dihydroxy-12-keto-(or hydroxy)-allo-sapogenins (wherein rings A and B are in the so-called trans configuration, i. e. the connection of the rings is such that the C–10 methyl group and the C–5 hydrogen atom are trans with respect to the plane formed by ring A) which can be obtained from agave plants as described in J. A. C. S. 69, 2167 (1947). Suitable starting materials include the pure sapogenins manogenin (2,3-dihydroxy-12-keto-22-isoallospirostane) and agabogenin (2,3-dihydroxy-12-hydroxy-22-isoallospirostane).

Instead of starting with the pure sapogenin, we can also employ cryde mixtures of these sapogenins containing the corresponding $\Delta^9$-dehydro-manogenin, 2,3-dihydroxy-12-keto-9,11-dehydro-22-isoallospirostane (compound 11 hereinbelow), and $\Delta^9$-dehydro-agavogenin, 2,3-dihydroxy-12-hydroxy-9,11-dehydro-22-isoallospirostane (compound 12) which may be structurally represented as follows:

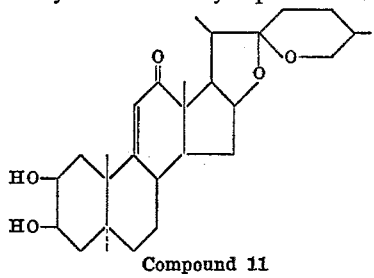

Compound 11

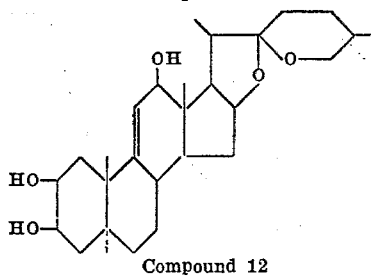

Compound 12

Crude manogenin, as obtained from the plant, is usually a mixture consisting of approximately 60 parts of manogenin and 40 parts of $\Delta^9$-dehydro-manogenin. Since the separation of the saturated from the unsaturated genin is extremely difficult, the fact that such mixtures can be utilized in our process constitutes an important and advantageous feature of our invention.

Where a mixture of the sapogenin and its $\Delta^9$-dehydro-derivative (that is a mixture of the 2,3-dihydroxy-12-oxygenated-isoallospirostane and $\Delta^9$-2,3-dihydroxy-12-oxygenated-22-isoallospirostene) is employed as the starting material, the crude mixture is reacted directly with a hydrocarbon sulfonyl chloride to produce a mixture containing the corresponding 2,3-bis(hydrocarbon-sulfonoxy)-12-oxygenated-22-isoallospirostane compound and $\Delta^9$-2,3-bis(hydrocarbon-sulfonoxy) - 12 - oxygenated - 22 - isoallospirostene compound. The mixture thus formed is reacted with an alkali metal iodide thereby producing a mixture containing the corresponding $\Delta^2$-12-oxygenated-22-isoallospirostene compound admixed with the $\Delta^{2,9}$-12-oxygenated-22-isoallospirostadiene compound. This mixture is reacted with metallic sodium and a lower alkanol, such as butanol, thereby reducing the $\Delta^9$-double bond of the $\Delta^{2,9}$-12-oxygenated-22-isoallospirostadiene compound without substantially affecting the unsaturated linkage attached to the carbon atom in the 2-position of the molecule, to produce a reduction product containing, as essentially the sole component, the corresponding $\Delta^2$-12-oxygenated-22-isoallospirostene compound (compound 3 hereinabove).

In carrying out our novel procedure, the 2,3-dihydroxy-12-oxygenated-22-isoallospirostane compound, such as 2,3-dihydroxy-12-keto-22-isoallospirostane, 2,3,12-trihydroxy-22-isoallospirostane and the like, or a mixture of said 2,3-dihydroxy-12-oxygenated-22-isoallospirostane and the corresponding $\Delta^9$-2,3-dihydroxy-12-oxygenated-22-isoallospirostene compound such as $\Delta^9$-2,3-dihydroxy-12 - keto - 22 - isoallospirostene, $\Delta^9$ - 2,3,12 - trihydroxy-22-isoallospirostene and the like is brought into contact with a hydrocarbon sulfonyl chloride, as for example, an alkane sulfonyl chloride such as methane sulfonyl chloride, ethane sulfonyl chloride, an aryl sulfonyl chloride such as benzene sulfonyl chloride, p-toluene sulfonyl chloride, an aryl-substituted alkane sulfonyl chloride such as phenyl-methane sulfonyl chloride, and the like. This reaction is conveniently conducted by bringing the reactants together in solution in a tertiary amine such as pyridine. The tertiary amine is preferably anhydrous, and the temperature of the reaction mixture is ordinarily maintained within the range of about 0–5° C. Under these reaction conditions the acylation reaction is substantially complete in about 24 hours. Where the starting material employed in the reaction contains a 12-hydroxy substituent, as in 2,3,12-trihydroxy-22-isoallospirostane or $\Delta^9$-2,3,12-trihydroxy-22-isoallospirostene, we ordinarily utilize substantially two molecular equivalents of hydrocarbon sulfonyl chloride to one molecular equivalent of the 2,3,12-trihydroxy-22-isoallospirostane or $\Delta^9$-dehydro derivative, whereby the hydroxy substituents attached to the C–2 and C–3 carbon atoms are preferentially esterified (sulfonated) and reaction of the 12-hydroxy grouping with the hydrocarbon sulfonyl chloride is minimized.

In accordance with this procedure, there is obtained, where pure manogenin or agavogenin is utilized as the starting material the corresponding 2,3-bis(hydrocarbonsulfonoxy) - 12 - oxygenated - 22 - isoallospirostane such as 2,3 - bis(methane - sulfonoxy) - 12 - keto - 22 - isoallospirostane, 2,3 - bis(benzene - sulfonoxy) - 12 - keto-22 - isoallospirostane, 2,3 - bis(p - toluene - sulfonoxy)-12 - keto - 22 - isoallospirostane, 2,3 - bis(methane-sulfonoxy) - 12 - hydroxy - 22 - isollospirostane, 2,3-bis(benzene - sulfonoxy) - 12 - hydroxy - 22 - isoallospirostane, 2,3 - bis(p - toluene - sulfonoxy) - 12 - hydroxy-22-isoallospirostane; where a mixture of the pure sapogenin and its Δ⁹-dehydro derivative is utilized, the product of the reaction with the hydrocarbon sulfonyl chloride consists of a mixture of the 2,3-bis(hydrocarbonsulfonoxy) - 12 - oxygenated - 22 - isoallospirostane (such as the compounds enumerated hereinabove) and the corresponding Δ⁹ - 2,3 - bis(hydrocarbon - sulfonoxy)-12 - oxygenated - 22 - isoallospirostene, such as Δ⁹ - 2,3-bis(methane - sulfonoxy) - 12 - keto - 22 - isoallospirostene, Δ⁹ - 2,3 - bis(benzene - sulfonoxy) - 12 - keto-22 - isoallospirostene, Δ⁹ - 2,3 - bis(p - toluene - sulfonoxy) - 12 - keto - 22 - isoallospirostene, Δ⁹ - 2,3-bis(methane - sulfonoxy) - 12 - hydroxy - 22 - isoallospirostene, Δ⁹ - 2,3 - bis(benzene - sulfonoxy) - 12 - hydroxy - 22 - isoallospirostene, Δ⁹ - 2,3 - bis(p - toluenesulfonoxy) - 12 - hydroxy - 22 - isoallospirostene, and the like.

The reaction between the sodium iodide and the 2,3-bis(hydrocarbon - sulfonoxy) - 12 - oxygenated - 22-isoallospirostane compounds, or between sodium iodide and mixtures of these 2,3 - bis(hydrocarbon - sulfonoxy)-12-oxygenated-22-isoallospirostane compounds and their Δ⁹-dehydro-derivatives, is carried out by bringing the reactants together in acetone solution, preferably at a temperature of about 100° C., under which conditions the elements of the hydrocarbon sulfonic acid are eliminated from the molecule to give the corresponding Δ² - 12-oxygenated-22-isoallospirostene compound such as Δ²-12-keto - 22 - isoallospirostene, Δ² - 12 - hydroxy - 22 - isoallospriostene, and the like; where a mixture of 2,3-bis-(hydrocarbon - sulfonoxy) - 12 - oxygenated - 22 - isoallospirostane compound and its Δ⁹-dehydro-derivative is reacted with sodium iodide the product is the corresponding Δ²-12-oxygenated-22-isoallospirostene admixed with Δ²,⁹ - 12 - oxygenated - 22 - isoallospirostadiene such as Δ²,⁹ - 12 - keto - 22 - isoallospirostadiene, Δ²,⁹ - 12 - hydroxy - 22 - isoallospirostadiene, and the like.

As set forth hereinabove, where a mixture of the Δ²-12-oxygenated-isoallospirostene compound and the corresponding Δ²,⁹ - 12 - oxygenated - 22 - isoallospirostadiene compound is obtained in accordance with the foregoing procedure, this mixture is reacted with metallic sodium in a lower alkanol such as butanol, preferably at the reflux temperature, whereby the Δ⁹-double bond in the Δ²,⁹ - 12 - oxygenated - 22 - isoallospirostadiene component of said mixture is reduced without substantially affecting the unsaturated linkage attached to the carbon atom in the 2-position of the molecule, to produce the other component of the mixture, the Δ²-12-oxygenated-22-isoallospirostene compound.

These Δ² - 12 - oxygenated - 22 - isoallospirostene compounds such as Δ²-12-keto-22-isoallospirostene, Δ²-12-hydroxy - 22 -isoallospirostene, and the like (whether obtained utilizing pure manogenin or agavogenin as starting materials or whether obtained utilizing as starting substances these sapogenins admixed with their Δ⁹-dehydro derivatives), are then reacted with an organic per-acid such as perbenzoic acid, perphthalic acid, and the like. The reaction between the Δ²-12-oxygenated-22-isoallospirostene and the organic per-acid is ordinarily carried out by bringing the reactants together in solution in a non-oxidizable organic solvent such as benzene, chloroform, and the like, preferably at a temperature within the range of 0–10° C., thereby forming the corresponding 2,3-epoxy-12-oxygenated-22-isoallospirostane compound such as 2,3-epoxy-12-keto-22-isoallospirostane, 2,3-epoxy-12-hydroxy-22-isoallospirostane, and the like.

The 2,3-epoxy-12-oxygenated-22-isoallospirostane compound is then reacted with a reducing agent, preferably lithium aluminum hydride, whereby the 2,3-epoxy substituent is converted to a 3α-hydroxy grouping and, at the same time, any nuclear keto radicals present in the molecule are converted to the corresponding hydroxy grouping. Thus, irrespective of whether 2,3-epoxy-12-keto-22-isoallospirostane or 2,3-epoxy-12-hydroxy-22-isoallospirostane is utilized in the reaction with lithium aluminum hydride, the product obtained is the 3α,12-dihydroxy-22-isoallospirostane. The reduction procedure is ordinarily carried out by intimately contacting the 2,3-epoxy-12-oxygenated-22-isoallospirostane compound and the reducing agent in a liquid medium; where lithium aluminum hydride is used as the reducing agent, the reaction is preferably conducted in either solution and at a temperature within the range of about 25–40° C.

Although the 3α,12-dihydroxy-22-isoallospirostane produced in accordance with the foregoing reduction procedure may be isolated in pure form if desired, we ordinarily react the crude 3α,12-dihydroxy-22-isoallospirostane with an oxidizing agent such as chromic acid, thereby producing 3,12-diketo-22-isoallospirostane, commonly known as hecogenone. The reaction between the crude 3α,12-dihydroxy-22-isoallospirostane and the chromic acid is conducted by intimately contacting the reactants in a non-oxidizable liquid medium, such as acetic acid, preferably at a temperature of about 25° C. Under these conditions the oxidation reaction is ordinarily complete in about thirty minutes. The hecogenone thus produced is recovered from the reaction mixture (after destroying any excess oxidizing agent which may be present) by evaporating the solvent, and the crude residual hecogenone is purified by recrystallization from an organic solvent such as ether.

The 3,12-diketo-22-isoallospirostane (hecogenone) is then reacted with a reducing agent, such as lithium aluminum hydride, utilizing substantially the same reaction conditions as those described hereinabove in connection with the reduction of the 2,3-epoxy-12-oxygenated-22-isoallospirostane compound, thereby forming 3β,12-dihydroxy-22-isoallospirostane.

The latter compound is then subjected to a partial acylation reaction, preferably utilizing as the acylating agent succinic anhydride in pyridine, to form the corresponding 3β - acyloxy-12-hydroxy - 22 - isoallospirostane compound such as 3β - (β-carboxy-propionoxy) - 12 - hydroxy-22-isoallospirostane, and the like. The latter compound is then reacted with an oxidizing agent, such as chromic acid in acetic acid (utilizing substantially the same reaction conditions as those employed hereinabove for the oxidation of the 3α,12-dihydroxy-22-isoallospirostane) thereby producing the corresponding 3β-acyloxy-12-keto-isoallospirostane such as 3β-(β-carboxy-propionoxy)-12-keto-22-isoallospirostane.

The 3β-acyloxy-12-keto-22-isoallospirostane is then reacted with a saponifying agent, such as an aqueous solution of an alkali metal hydroxide. It is ordinarily preferred to conduct the saponification by heating an aqueous methanol solution containing potassium hydroxide and the 3β - acyloxy - 12 - keto-22-isoallospirostane compound under reflux thereby forming the desired 3β-hydroxy-12-keto-22-isoallospirostane, commonly known as hecogenin. The hecogenin is conveniently recovered by evaporating the hydrolysis solution to dryness, the residual crude hecogenin is readily purified by extracting the residue with chloroform, washing the chloroform solution with water, and crystallizing the crude product from a mixture of chloroform and ethyl acetate.

The following examples illustrate methods of carrying out the present invention but it is to be understood that these examples are given for purposes of illustration and not of limitation.

*Example 1*

Ten grams of dry 2,3-dihydroxy-12-keto-22-isoallospirostane, commonly known as manogenin, was dissolved in 100 cc. of anhydrous pyridine, and 10 cc. of methane sulfonyl chloride was added to the resulting solution while maintaining the temperature within the range of 0–5° C. The resulting mixture was allowed to stand at a temperature of 0 to 5° C. for a period of about twenty-four hours, and the reaction product was then poured into ice-water. The solid material which crystallized from the aqueous mixture was recovered by filtration, washed several times with water and dried. The dry material was recrystallized from acetone-ethyl acetate to give 11 g. of crystalline 2,3-bis(mesyloxy)-12-keto-22-isoallospirostane; M. P. 241–242° C. dec. *Analysis.*—Calc'd for $C_{29}H_{46}O_9S_2$: C, 57.81; H, 7.64; S, 10.63. Found: C, 57.93; H, 7.52; S, 10.71.

*Example 2*

Six grams of 2,3-bis(mesyloxy)-12-keto-22-isoallospirostane and 25 g. of sodium iodide were dissolved in 300 cc. of acetone and the solution was heated at a temperature of about 100° C. in a closed vessel under pressure for a period of about seventeeen hours. The reaction mixture was then filtered thereby removing the precipitated sodium methane sulfonate by-product and the latter was washed with copious portions of acetone. The acetone mother liquor and washings were combined and the acetone evaporated therefrom in vacuo. The residual material was dissolved in ether-chloroform and the resulting solution was washed free of iodine with 2% aqueous sodium thiosulfate solution. The organic layer was dried over anhydrous sodium sulfate, evaporated to dryness, and the residual material was recrystallized from acetone to give 2.9 g. of $\Delta^2$-12-keto-22-isoallospirostene; M. P. 182–184° C. *Analysis.*—Calc'd for $C_{27}H_{40}O_3$: C, 78.59; H, 9.77. Found: C, 78.81; H, 9.73.

*Example 3*

Eight and two-tenths cubic centimeters of a benzene solution of perbenzoic acid (0.33 millimole per cc.) was added to a solution of 1 g. of $\Delta^2$-12-keto-22-isoallospirostene in 10 cc. of benzene. The resulting mixture was allowed to stand at a temperature of about 0–10° C. for a period of about forty-eight hours. The reaction solution was diluted to four times its volume with ether, and the resulting ethereal solution was washed free of excess perbenzoic acid with cold 5% aqueous sodium carbonate solution. The washed ethereal solution was dried, evaporated to dryness and the residual material was recrystallized from ether-petroleum ether to give 0.6–0.7 g. of $2\alpha,3\alpha$-epoxy-12-keto-isoallospirostane; M. P. 199–201° C. *Analysis.*—Calc'd for $C_{27}H_{40}O_4$: C, 75.70; H, 9.35. Found: C, 76.02; H, 9.35.

*Example 4*

One gram of $2\alpha,3\alpha$-epoxy-12-keto-22-isoallospirostane was dissolved in 35 cc. of anhydrous ether, and the solution was added, with stirring to a solution of 200 mg. of lithium aluminum hydride in 70 cc. of ether, while maintaining the temperature of the mixture at about 25° C. The resulting solution was stirred at a temperature of about 25° C. for an additional period of forty-five minutes, and then at the reflux temperature of the ether solution for a five minute period. The reaction mixture was cooled to a temperature of about 0° C. and aqueous hydrochloric acid was added to the cold reaction mixture to decompose unreacted lithium aluminum hydride. The ethereal reaction solution was separated from the aqueous layer, washed with water, and dried over anhydrous sodium sulfate. The dry ethereal solution was then evaporated to give approximately 1 g. of crude $3\alpha,12$-dihydroxy-22-isoallospirostane which was obtained in the form of an amorphous powder.

One gram of crude $3\alpha,12$-dihydroxy-22-isoallospirostane was dissolved in 125 cc. of acetic acid and to the solution was added a solution of 750 mg. of chromic acid anhydride in 50 cc. of 80% aqueous acetic acid. The resulting mixture was allowed to stand at a temperature of about 25° C. for a period of about thirty minutes. Sufficient methanol was added to the reaction mixture to destroy the excess oxidizing agent, and the solvents were evaporated from the solution in vacuo. The residual material was extracted with ether, and the ether solution was washed thoroughly with 10% aqueous sodium hydroxide solution thereby removing acidic materials. The ethereal solution was then dried and the ether evaporated therefrom to give 0.49 g. of 3,12-diketo-22-isoallospirostane (commonly known as hecogenone) which was obtained in the form of small colorless needles; M. P. 238–241.5° C. *Analysis.*—Calc'd for $C_{27}H_{40}O_4$: C, 75.70; H, 9.35. Found: C, 75.44; H, 9.09.

*Example 5*

To a solution of 1.5 g. of lithium aluminum hydride in 100 ml. of dry ether was added dropwise, with stirring, a solution of 1.7 g. of 3,12-diketo-22-isoallospirostane (hecogenone) dissolved in 75 ml. of anhydrous tetrahydrofuran. The reaction mixture was stirred for two hours at room temperature, and the excess lithium aluminum hydride was decomposed first with ice water and then with ice-cold dilute aqueous hydrochloric acid solution. The organic layer was separated, washed with water, dried and the solvents evaporated therefrom to give $3\beta,12$-dihydroxy-22-isoallospirostane which was obtained in the form of an oily residue which crystallized on standing; M. P. 198–202° C.

The crude $3\beta,12$-dihydroxy-22-isoallospirostane prepared as described above was dissolved in 20 ml. of anhydrous pyridine, treated with 3 g. of succinic anhydride, and the mixture heated at a temperature of 100° C. for two or three hours in a nitrogen atmosphere. At the end of this period, the pyridine was evaporated from the solution in vacuo, and the residual material was extracted with water and chloroform. The chloroform layer was extracted with dilute aqueous hydrochloric acid, washed with water, dried over sodium sulfate and evaporated to dryness to give 2.4 g. of crude $3\beta$-($\beta$-carboxy-propionoxy)-12-hydroxy-22-isoallospirostane.

A solution of the crude $3\beta$-($\beta$-carboxy-propionoxy)-12-hydroxy-22-isoallospirostane (prepared as described above) in 60 ml. of acetic acid containing 350 mg. of chromic acid was allowed to stand at a temperature of about 25° C. for a period of about fifteen hours. Sufficient methanol was added to the reaction mixture to decompose the excess chromic acid, and the solvents were evaporated from the resulting mixture in vacuo. The residual material was dissolved in chloroform-ether, and the organic layer was washed with water, dried over anhydrous sodium sulfate, and evaporated to dryness to give 2.16 g. of crude $3\beta$-($\beta$-carboxy-propionoxy)-12-keto-22-isoallospirostane. The crude $3\beta$-($\beta$-carboxy-propionoxy)-12-keto-22-isoallospirostane was dissolved in 50 ml. of methanol, a solution of 4 g. of potassium hydroxide in 5 cc. of water was added to the methanolic solution, and the resulting mixture was heated under reflux for a period of about four hours in a nitrogen atmosphere. The solvents were evaporated from the reaction solution in vacuo, and the residual material was extracted with chloroform. The chloroform solution was washed with water until neutral, dried and evaporated to dryness. The residual crystalline material was crystallized from chloroform-ethyl acetate to give substantially pure $3\beta$-hydroxy-12-keto-22-isoallospirostane, commonly known as hecogenin, which was obtained in the form of silvery plates or prisms; M. P. 263–264° C.

*Example 6*

Ten grams of a dry mixture of 2,3-dihydroxy-12-keto-22-isoallospirostane and $\Delta^9$-2,3-dihydroxy-12-keto-22-isoallospirostene were dissolved in 100 cc. of anhydrous pyridine, and 10 cc. of methane sulfonyl chloride were added to the resulting solution while maintaining the temperature at about 0° C. The resulting mixture was allowed to stand at a temperature of 0 to 10° C. for a period of about twenty-four hours, and the reaction product was then poured into ice-water. The solid material which crystallized from the aqueous mixture was recovered by filtration, washed several times with water and dried. The dry material was recrystallized from acetone-ethyl acetate to give about 10 g. of a mixture of 2,3-bis(mesyloxy)-12-keto-22-isoallospirostane and $\Delta^9$-2,3-bis(mesyloxy)-12-keto-22-isoallospirostene.

*Example 7*

Six grams of a mixture of 2,3-bis(mesyloxy)-12-keto-22-isoallospirostane and $\Delta^9$-2,3-bis(mesyloxy)-12-keto-22-isoallospirostene (prepared as described in Example 6), and 25 g. of sodium iodide were dissolved in 300 cc. of acetone, and the solution was heated at a temperature of about 100° C. in a closed vessel under pressure for a period of about seventeen hours. The reaction mixture was then filtered thereby removing the precipitated sodium methane sulfonate by-product and the latter was washed with copious portions of acetone. The acetone mother liquor and washings were combined, and the acetone evaporated therefrom in vacuo. The residual material was dissolved in ether-chloroform, and the resulting solution was washed free of iodine with 2% aqueous sodium thiosulfate solution. The organic layer was dried over anhydrous sodium sulfate, evaporated to dryness, and the residual material was recrystallized from acetone to give about 3 grams of a mixture of $\Delta^2$-12-keto-22-isoallospirostene and $\Delta^{2,9}$-12-keto-22-isoallospirostadiene.

*Example 8*

About 3 grams of a mixture of $\Delta^2$-12-keto-22-isoallospirostene, and $\Delta^{2,9}$-12-keto-22-isoallospirostadiene (prepared as described in Example 7 hereinabove) were dissolved in 500 cc. of n-butanol. The resulting solution was heated at the reflux temperature, and 15 g. of metallic sodium were added portion-wise to the solution at a rate so as to maintain a vigorous reaction. After all of the sodium had reacted, 200 ml. of water was added to the reaction solution and the butanol was evaporated from the aqueous butanol solution in vacuo. The residual aqueous slurry was filtered and the crystalline product dried to give $\Delta^2$-12-keto-22-isoallospirostene substantially free of the $\Delta^9$-dehydro- derivative.

This product was converted to 3$\beta$-hydroxy-12-keto-22-isoallospirostane (hecogenin) in accordance with the procedure described in Examples 3, 4 and 5 hereinabove.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a 2,3-dihydroxy-12-oxygenated-22-isoallospirostane compound with a hydrocarbon sulfonyl chloride to produce the corresponding 2,3-bis(hydrocarbon-sulfonoxy)-12-oxygenated-22-isoallospirostane compound, reacting this compound with an alkali metal iodide to form the corresponding $\Delta^2$-12-oxygenated-22-isoallospirostene compound, reacting said $\Delta^2$-12-oxygenated-22-isoallospirostene compound with an organic per-acid to produce the corresponding 2,3-epoxy-12-oxygenated-22-isoallospirostane compound, reacting the latter compound with a reducing agent thereby forming 3$\alpha$,12-dihydroxy-22-isoallospirostane, reacting said 3$\alpha$,12-dihydroxy-22-isoallospirostane with an oxidizing agent to produce 3,12-diketo-22-isoallospirostane, reacting this compound with a reducing agent to form 3$\beta$,12-dihydroxy-22-isoallospirostane, reacting said 3$\beta$,12-dihydroxy-22-isoallospirostane with approximately one equivalent of an acylating agent to produce the corresponding 3$\beta$-acyloxy-12-hydroxy-22-isoallospirostane, reacting the latter compound with an oxidizing agent thereby forming the corresponding 3$\beta$-acyloxy-12-keto-22-isoallospirostane, and reacting the latter compound with a hydrolyzing agent to produce 3$\beta$-hydroxy-12-keto-22-isoallospirostane.

2. The process which comprises reacting a mixture of a 2,3-dihydroxy-12-oxygenated-22-isoallospirostane compound and the corresponding $\Delta^9$-2,3-dihydroxy-12-oxygenated-22-isoallospirostene compound with a hydrocarbon sulfonyl chloride to produce a mixture of the corresponding 2,3-bis(hydrocarbon-sulfonoxy)-12-oxygenated-22-isoallospirostane compound, and the corresponding $\Delta^9$-2,3-bis(hydrocarbon-sulfonoxy)-12-oxygenated-22-isoallospirostene compound, reacting this mixture with an alkali metal iodide to form a mixture of the corresponding $\Delta^2$-12-oxygenated-22-isoallospirostene compound and the corresponding $\Delta^{2,9}$-12-oxygenated-22-isoallospirostadiene compound, reacting said mixture with metallic sodium in a medium comprising a lower aliphatic alcohol thereby converting the $\Delta^{2,9}$-12-oxygenated-22-isoallospirostadiene component of the mixture to the corresponding $\Delta^2$-12-oxygenated-22-isoallospirostene compound, reacting said $\Delta^2$-12-oxygenated-22-isoallospirostene compound with an organic per-acid to produce the corresponding 2,3-epoxy-12-oxygenated-22-isoallospirostane compound, reacting the latter compound with a reducing agent thereby forming 3$\alpha$,12-dihydroxy-22-isoallospirostane, reacting said 3$\alpha$,12-dihydroxy-22-isoallospirostane with an oxidizing agent to produce 3,12-diketo-22-isoallospirostane, reacting this compound with lithium aluminum hydride to form 3$\beta$,12-dihydroxy-22-isoallospirostane, reacting said 3$\beta$,12-dihydroxy-22-isoallospirostane with approximately one equivalent of an acylating agent to produce the corresponding 3$\beta$-acyloxy-12-hydroxy-22-isoallospirostane, reacting the latter compound with an oxidizing agent thereby forming the corresponding 3$\beta$-acyloxy-12-keto-22-isoallospirostane, and reacting the latter compound with a hydrolyzing agent to produce 3$\beta$-hydroxy-12-keto-22-isoallospirostane.

3. The process which comprises reacting 2,3-dihydroxy-12-keto-22-isoallospirostane with a hydrocarbon sulfonyl chloride to produce the corresponding 2,3-bis(hydrocarbon-sulfonoxy)-12-keto-22-isoallospirostane compound, reacting this compound with an alkali metal iodide to form $\Delta^2$-12-keto-22-isoallospirostane, reacting said $\Delta^2$-12-keto-22-isoallospirostene with an organic per-acid to produce 2,3-epoxy-12-keto-22-isoallospirostane, reacting the latter compound with a reducing agent thereby forming 3$\alpha$,12-dihydroxy-22-isoallospirostane, reacting said 3$\alpha$,12-dihydroxy-22-isoallospirostane with an oxidizing agent to produce 3,12-diketo-22-isoallospirostane, reacting this compound with a reducing agent to form 3$\beta$,12-dihydroxy-22-isoallospirostane, reacting said 3$\beta$,12-dihydroxy-22-isoallospirostane with approximately one equivalent of an acylating agent to produce the corresponding 3$\beta$-acyloxy-12-hydroxy-22-isoallospirostane, reacting the latter compound with an oxidizing agent thereby forming the corresponding 3$\beta$-acyloxy-12-keto-22-isoallospirostane, and reacting the latter compound with a hydrolyzing agent to produce 3$\beta$-hydroxy-12-keto-22-isoallospirostane.

4. The process which comprises reacting 2,3-dihydroxy-12-keto-22-isoallospirostane with a hydrocarbon sulfonyl chloride to produce the corresponding 2,3-bis(hydrocarbon-sulfonoxy)-12-keto-22-isoallospirostane compound, reacting this compound with an alkali metal iodide to form $\Delta^2$-12-keto-22-isoallospirostane, reacting said $\Delta^2$-12-keto-22-isoallospirostene with an organic per-acid to produce 2,3-epoxy-12-keto-22-isoallospirostane, reacting the latter compound with lithium aluminum hydride thereby forming 3$\alpha$,12-dihydroxy-22-isoallospirostane, reacting said 3$\alpha$,12-dihydroxy-22-isoallospirostane with chromium trioxide to produce 3,12-diketo-22-isoallospirostane, reacting this compound with lithium aluminum hydride to form 3$\beta$,12-dihydroxy-22-isoallospirostane, reacting said 3$\beta$,12-dihydroxy-22-isoallospirostane with approximately one equivalent of an acylating agent to produce the corresponding 3$\beta$ - acyloxy - 12 - hydroxy-22-isoallospirostane, reacting the latter compound with chromium trioxide thereby forming the corresponding 3$\beta$-acyloxy-12-keto-22-isoallospirostane, and reacting the latter compound with a hydrolyzing agent to produce 3$\beta$-hydroxy-12-keto-22-isoallospirostane.

5. The process which comprises reacting 2,3-dihydroxy-12-keto-22-isoallospirostane with methane sulfonyl chloride to form 2,3-bis(mesyloxy)-12-keto-22-isoallospirostane, heating the latter compound with sodium iodide in a medium comprising acetone to form $\Delta^2$-12-keto-22-isoallospirostene, reacting said $\Delta^2$-12-keto-isoallospirostene with per-benzoic acid to produce 2,3-epoxy-12-keto-22-isoallospirostane, reacting this compound with lithium aluminum hydride thereby forming 3$\alpha$,12-dihydroxy-22-isoallospirostane, reacting the latter compound with chromic acid in a medium comprising acetic acid to produce 3,12-diketo-22-isoallospirostane, reacting said 3,12-diketo-22-isoallospirostane with lithium aluminum hydride to form 3$\beta$,12-dihydroxy-22-isoallospirostane, reacting the latter compound with succinic anhydride in pyridine to form 3$\beta$-($\beta$-carboxy-propionoxy)-12-hydroxy-22-isoallospirostane, reacting said 3$\beta$-($\beta$-carboxy-propionoxy)-12-hydroxy-22-isoallospirostane with chromic acid in acetic acid to form 3$\beta$-($\beta$-carboxy-propionoxy)-12-keto-22-isoallospirostane, and reacting the latter compound with an aqueous solution of potassium hydroxide to produce 3$\beta$-hydroxy-12-keto-22-isoallospirostane.

6. 2,3 - bis(hydrocarbon - sulfonoxy) - 22 - isoallospirostane compounds having a radical selected from the group consisting of keto and hydroxy radicals attached to the C–12 carbon atom.

7. 2,3-bis(mesyloxy)-12-keto-22-isoallospirostane.

References Cited in the file of this patent

UNITED STATES PATENTS

| Number | Name | Date |
|---|---|---|
| 2,408,833 | Wagner | Oct. 8, 1946 |
| 2,408,834 | Wagner | Oct. 8, 1946 |
| 2,408,835 | Wagner | Oct. 8, 1946 |